United States Patent Office 3,395,098
Patented July 30, 1968

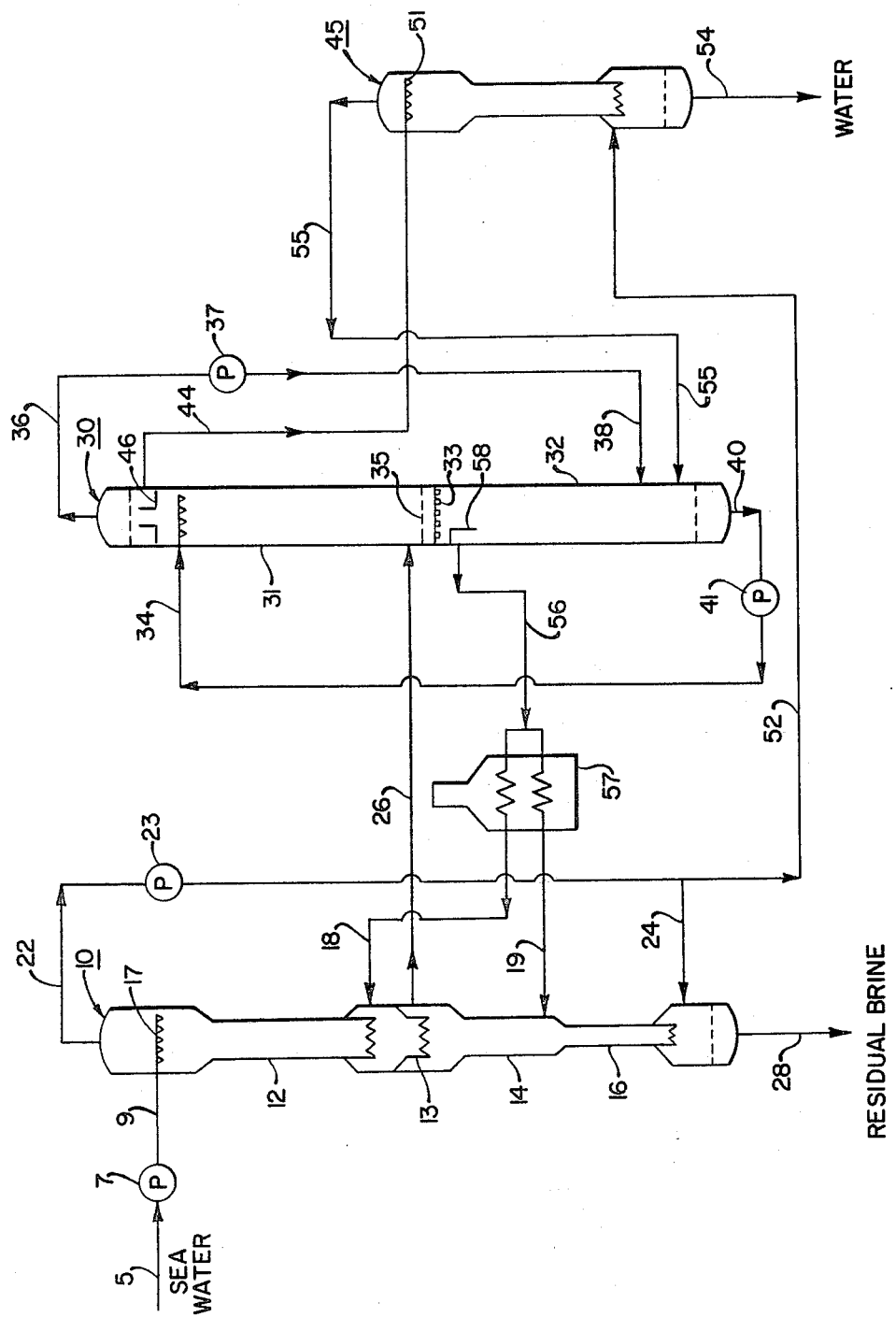

3,395,098
RECOVERY OF FRESH WATER FROM BRINE
Howard V. Hess, Glenham, and Frank E. Guptill, Jr., Fishkill, N.Y., assignors to Texaco Inc., New York, N.Y., a corporation of Delaware
Filed Nov. 19, 1964, Ser. No. 412,400
10 Claims. (Cl. 210—22)

The present invention relates to a novel process and apparatus for seperating fresh water from brine. The process is applicable to the recoveryy of salt-free water from brines and to the concentration of various brines for the recovery of soluble salts contained therein.

In one of its more specific aspects, the present invention is concerned with a process for separating water from a salt solution or brine wherein an organic liquid, e.g. a hydrocarbon, characterized by the property of extracting a greater amount of water at a high temperature (e.g., at a temperature of 500° F. or above) than at a lower temperature is brought into contact with brine at elevated temperature to extract water from the brine and form a complex substantially free from inorganic salts. The complex, which may be a liquid phase or dense vapor phase, is immiscible with the residual brine and is separated from the brine by gravity. After separation of the complex from the residual brine, the complex is resolved by reducing the temperature sufficiently below the extraction temperature to cause the organic liquid and water to separate from one another as two immiscible liquid phases. The separated water, residual brine, or salts liberated from the brine may be recovered as product of the process and the organic liquid may be recycled to the process.

The term "brine" is used in a broad sense to denote the entire range of concentrations of water soluble inorganic salts in water, for example, natural saline water containing sodium chloride, including brackish water, sea water, and saturated or nearly saturated brines, such as the brine in Great Salt Lake or brines obtained from wells. In addition to sodium chloride-containing solutions, other brines to which the process may be applied include aqueous solutions of dissolved mineral salts, for example, halides, carbonates and sulfates of sodium, potassium, lithium, calcium, magnesium, zinc and copper.

Hydrocarbon liquids are preferred for the extraction of water from brines by the process of this invention. Other organic liquids which may be used in the process include high molecular weight hydrocarbon derivatives, e.g., 8 to 12 carbon atom alcohols, ketones and ethers.

The basic process is disclosed in the copending U.S. patent application of Howard V. Hess, Ser. No. 144,240, filed Oct. 10, 1961, now abandoned.

The term "complex" is used herein to designate the solution of water in organic liquid or the mixed vapors, leaving the extraction zone in the process of this invention.

For greatest efficiency, the extraction step of the present process should be operated at a temperature above 500° F. The temperature of the complex is reduced below the extraction temperature for the separation of water from the complex. Advantageously the complex is cooled at least 50° F. below the extraction temperature to assure breaking out the major part of the water. Somewhat greater efficiency is usually obtained if the extraction temperature is kept above 550° F.

By way of illustration, n-decane has the property of extracting 22.2% of its weight of water at 575° F., 9% at 550° F., and only 3.3% at 500° F. Consequently, with the extraction process operating at 575° F., and the water recovery step at 500° F., there is a recovery of water in the amount equivalent to about 19 percent of the weight of the n-decane.

The operating pressure of the extraction step should be sufficiently high to maintain the brine in liquid phase at the operating temperature. The operating pressure is usually greater than 1000 p.s.i.g. and sometimes as high as 3000 p.s.i.g. Generally the complex is resolved and the water separated from the organic liquid at the same operating pressure as that in the extraction step.

The upper temperature limit should be below the temperature at which decomposition of the organic liquid might take place under the conditions of the system.

Normally liquid hydrocarbons are generally suitable for use in the process of this invention. Hydrocarbons and mixtures of hydrocarbons containing from 6 to 30 carbon atoms per molecule may be used. Hydrocarbons of 6 to 12 carbon atoms per molecule are preferred. Various petroleum fractions including kerosene, naphtha, odorless spirits, gasoline, lubricating oils, "alkylation bottoms," i.e., the bottoms fraction obtained from the alkylation of butylenes with isobutane, $C_9$–$C_{10}$ aromatic hydrocarbons, e.g., aromatic hydrocarbons obtained by alkylation of benzene or toluene with propylene, Udex extract, i.e. an aromatic hydrocarbon fraction obtained from petroleum naphtha by extraction with diethylene glycol containing water, may be used in the process. Examples of individual hydrocarbon types which can be used in the process, either alone or in admixture with one another, are the aliphatic hydrocarbons, including hexane, 2,3-dimethylbutane, heptanes, octanes, isooctane, nonanes, decanes, propylene tetramer, hexadecane, 2-methyl-1-pentene, etc.; alicyclic hydrocarbons, e.g., methylcyclopentane, cyclohexane, methylcyclohexane, dimethylcyclohexane, ethylcyclohexane, tetralin, isopropylcyclohexane, cyclohexene, pinene, etc.; and aromatic hydrocarbons, e.g., benzene, toluene, cumene, xylenes, methylnaphthalenes, etc.

The preferred organic liquids are those which are stable under the temperature and pressure conditions employed in the process, for example, 550° F. to 650° F. and 1000 to 3000 p.s.i.g. If the water is to be used for domestic purposes, the organic liquid employed should have low toxicity and low solubility in water at ordinary temperatures and atmospheric pressure. In general, the aromatic hydrocarbons are preferred for concentration of brines for salt recovery and the saturated hydrocarbons are preferred for the production of potable water.

The figure illustrates diagrammatically an arrangement of apparatus suitable for carrying out the process of this invention as applied to the recovery of fresh water from sea water.

With reference to the figure, efficient plant for extraction of water from brine is illustrated. The temperatures and pressures referred to in the following detailed description of the drawing are with reference to a specific example using Udex extract as the hydrocarbon and mercury as the heat transfer agent.

In this specific example, sea water containing 3 percent salt by weight is drawn in at ambient temperature, for example, 70° F., from a suitable source of supply by pump 7 at the rate of 4224 pounds per hour, raised to operating pressure of 1000 p.s.i.g., and delivered through line 9 into the upper part of a long, vertical, cylindrical pressure vessel 10. Vessel 10 comprises a series of vertically arranged superimposed countercurrent contacting columns comprising a brine heater 12 in the upper portion of vessel 10, an extractor 14 in its midsection, and a brine cooler 16 in its lower portion. The diameter of the vessel may vary with the different sections depending upon the volumes of fluids handled in each of the columns. Brine enters the vessel near the top of column 12 through a suitable distributor or sparger 17 which disperses the brine in hydrocarbon liquid. In operation, brine heater 12 is maintained full of liquid with hydrocarbon liquid as the continuous phase and brine as the discontinuous phase. Hot hydrocarbon liquid may be introduced to the vessel through line 18 or line 19 or through both simultaneously. In this particular example, Udex extract is supplied through both line 18 and line 19.

The brine flows downwardly in heater 12 in direct countercurrent contact with upwardly flowing Udex extract supplied through line 18 to the lower part of brine heater 12 at a temperature much higher than the temperature of the entering brine. In this example, the Udex extract enters through line 18 at 660° F. at the rate of 6450 pounds per hour, together with 466 pounds per hour of water. The sea water or brine is heated in heater 12 by direct contact with the hydrocarbon liquid to 640° F. While the hydrocarbon is cooled to a temperature near the temperature of the incoming water, i.e. 90° F. This type direct heating almost entirely eliminates the problems of scale deposition and metal corrosion encountered with indirect heaters.

It is preferred that the operation be carried out with vessel 10 substantially completely filled with liquid with hydrocarbon liquid as the continuous phase. The brine level normally is restricted to a small area at the lower end of vessel 10 just sufficient to insure withdrawal of residual brine substantially free from hydrocarbon. The hydrocarbon liquid wets the walls of the remainder of the vessel and protects the metal walls from contact with the brine. The arrangement illustrated in the drawing, in which each section of the column terminates at its lower end at a point below the top of the next succeeding lower section, insures hydrocarbon flow along the wall of the column with substantially uniform distribution around its circumference. It is preferable to provide serrations at the lower ends of sections 12 and 16 as illustrated in the drawing. The lower part of trap tray 13 may be similarly serrated to provide uniform distribution of upflowing hydrocarbon and protect the tray from corrosion.

Hydrocarbon liquid at 90° F. is drawn from the top of vessel 10 through line 22 by pump 23 at the rate of 7296 pounds per hour, together with 5 pounds per hour dissolved water. Part of the cooled hydrocarbon liquid from line 22 is reintroduced into the lower portion of vessel 10 through line 24 at the rate of 846 pounds per hour with about one pound per hour of water to recover heat from residual brine as described hereinafter.

Hot brine at about 640° F. from brine heater 12 flows through trap tray 13 at the rate of 4199 pounds per hour into extractor 14 where it is contacted with hot hydrocarbon liquid at 640° F. entering through line 19 at the rate of 4234 pounds per hour together with 305 pounds per hour of water. The resulting complex, comprising 4234 pounds hydrocarbon and 4234 pounds water per hour, is withdrawn at 640° F. from the upper part of extractor 14 through line 26. The trap tray 13 permits withdrawal of the complex, which is immiscible with the brine and has a lower specific gravity than the brine, from the extractor through line 26 free from residual brine.

Residual brine from extractor 14 flows downwardly through brine cooler 16 where it is brought into direct countercurrent contact with an upwardly flowing stream of relatively cool hydrocarbon liquid introduced through line 24 at the rate of 846 pounds per hour together with one pound per hour of water. The residual brine is cooled to about 265° F. in brine cooler 16 and discharged through line 28 at the rate of 757 pounds per hour.

Complex from line 26 is introduced to the midsection of vessel 30. Vessel 30 comprises a vertical cylindrical pressure vessel having a cooling section 31 in its upper portion for cooling and resolving the complex, and a heater section 32 in its lower portion to reheat the hydrocarbon separated from the complex. The complex is introduced into the lower part of cooler 31 where it is brought into direct countercurrent contact with relatively cool mercury as a heat transfer agent. The mercury is introduced through line 34 to the upper part of cooler 31 at 490° F. and at the rate of 281,470 pounds per hour. In passing down through the column, the mercury is heated and the complex cooled effecting liberation of water and separation of the hydrocarbon and water into two separate liquid phases.

The hydrocarbon and water phases at 500° F. liberated from the complex are passed up through trap tray 46 and separated from one another by gravity. The hydrocarbon is drawn from the top of vessel 30 through line 36 by pump 37 at the rate of 4234 pounds per hour together with 371 pounds per hour of water and recirculated to the vessel, entering the lower portion of hydrocarbon heater 32 through line 38. Mercury, heated to 630° F. flows from the lower end of cooler 31 into the upper end of hydrocarbon heater 32 where it is uniformly distributed by a distributor 33, e.g. a perforated tray. The mercury, cooled to 490° F., in the hydrocarbon heater 32 is withdrawn from the bottom of vessel 30 through line 40 and recirculated by pump 41 through line 34 to the upper portion of vessel 30 at the rate of 281,470 pounds per hour.

It will be observed that the heat transfer medium, which in this example is mercury, serves the function of transferring heat from hot complex in cooler 31 to the hydrocarbon liquid in heater 32 by direct heat exchange.

It is desirable to maintain a pool of heat exchange medium, e.g., mercury, in the lower part of cooler 31 as a barrier to prevent water or complex from cooler 31 from entering the hydrocarbon cooling section 32 and vice versa. The pool of mercury is indicated on the drawing by dotted line 35 indicating the liquid level of the mercury and the dotted line 33 representing a perforated tray separating cooling section 31 from heating section 32 of column 30.

Water liberated from the complex in cooler 31 is withdrawn from the upper part of vessel 30 above trap tray 46 through line 44 at 500° F. and at the rate of 3863 pounds per hour and delivered to the upper part of pressure vessel 45. Vessel 45 comprises a long vertical countercurrent contacting column for direct heat exchange between water and hydrocarbon liquid with an enlarged section at each end for separation of hydrocarbon and water from one another. Water from the top of vessel 30 is introduced into vessel 45 and dispersed by a sparger or distributor 51 into a stream of upwardly flowing hydrocarbon liquid. In operation, water cooler vessel 45 is maintained full of liquid with hydrocarbon liquid as the continuous phase and water as the discontinuous phase. Cool hydrocarbon liquid from the upper end of vessel 10 is delivered to the lower part of vessel 45 through line 52 at 90° F. and at the rate of 6450 pounds per hour, together with 4 pounds per hour water. In column 45, the water is cooled from 500° F. to 110° F. by direct countercurrent contact with hydrocarbon liquid while the hydrocarbon is heated from 90° F. to 480° F. Product water is drawn from the bottom of column 45 through line 54 at the rate of 3467 pounds per hour at 110° F.

Hydrocarbon liquid at 480° F. is withdrawn from the top of column 45 through line 55 at the rate of 6450 pounds per hour together with 400 pounds per hour of water and introduced into the lower part of hydrocarbon heater section 32 in vessel 30. Heated hydrocarbon liquid at about 625° F. is drawn from the upper portion of heater 32 through line 56 at the rate of 10,684 pounds per hour together with 771 pounds per hour of water and passed through heater 57. Baffle 58 permits withdrawal of hydrocarbon from heater 32 without entrainment of mercury. In heater 57, part of the hydrocarbon is heated to 640° F. and introduced through line 19 into extractor 14 at the rate of 4234 pounds per hour together with 305 pounds of water per hour, while the remainder, heated to 660° F., is introduced through line 18 to the lower portion of brine heater 12 at the rate of 6450 pounds per hour together with 466 pounds of water.

While the process has been described above with the recovery of salt-free water from brine as the primary object, it is to be understood that the desired product may be salts from the brine. Concentrated saturated or unsaturated brine may be produced, or crystallization of salts may be permitted to take place in the extractor and the salt crystals withdrawn, with or without cooling, from the extractor together with mother liquor.

While mercury is the heat transfer agent in the foregoing specific example, other heat transfer agents may be used. Molten materials which are insoluble in water and in the organic liquid are useful as heat transfer agents, e.g., sulfur, gallium, Wood's metal (50 Bi, 25 Pb, 12.5 Sn, 12.5 Cd), Rose's metal (46–50 Bi, 20–28 Pb, 34–22 Sn), low melting lead-in eutectic (37 Pb, 63 Sn), Lipowitz' alloy (50 Bi, 26.7 Pb, 13.3 Sn, 10 Cd), White metal (75 Pb, 19 Sb, 5 Sn, 1 Cu), and other low melting point metal alloys and eutectics. Particulate solids, e.g., lead shot and sand also may be used but are in general less desirable than the liquids or molten solids.

We claim:

1. A process for extracting water from brine which comprises contacting brine at an elevated temperature above about 500° F. and at a pressure sufficient to maintain brine in liquid phase with an organic liquid characterized by the ability to extract more water at a higher temperature than at a lower temperature and form a complex therewith, withdrawing complex so formed from contact with residual brine, cooling said complex by an amount sufficient to form a separate water phase and organic liquid phase by direct countercurrent contact with relatively cool immiscible heat transfer agent thereby heating said heat transfer agent, withdrawing water liberated from said extract, separately withdrawing organic liquid phase liberated from said extract and heating said separated organic liquid phase by direct countercurrent contact with heated heat transfer agent resulting from cooling of said extract thereby cooling said heat transfer agent and heating said organic liquid phase, passing said heated organic liquid phase into contact with brine, and passing cooled heat transfer agent into contact with said complex.

2. A process according to claim 1 wherein said organic liquid is a hydrocarbon liquid.

3. A process according to claim 1 wherein heat transfer agent is selected from the group consisting of low melting metals and metal alloys.

4. A process as defined in claim 1 wherein water liberated from said complex is cooled by direct countercurrent contact with cool organic liquid thereby heating said organic liquid, and said heated organic liquid is thereafter further heated by direct countercurrent contact with said heat transfer agent and passed into contact with said brine.

5. A process according to claim 1 wherein heated organic liquid is passed in direct countercurrent contact with cool brine whereby said brine is heated and said organic liquid is cooled.

6. A process according to claim 1 wherein relatively cool organic liquid is passed in direct countercurrent contact with said residual brine thereby cooling said residual brine and heating said hydrocarbon liquid.

7. A process for extracting water from brine which comprises contacting brine with a hydrocarbon liquid at an elevated temperature above about 500° F. and at a pressure sufficient to maintain brine in liquid phase forming a complex comprising water in hydrocarbon liquid, withdrawing said complex from contact with residual brine, cooling said complex by direct countercurrent contact with relatively cool immiscible heat transfer liquid effecting liberation of water from said extract and forming a water phase and a hydrocarbon-rich phase while simultaneously heating said heat transfer liquid, withdrawing said hydrocarbon-rich phase, separating water liberated from said complex and cooling said water by direct countercurrent contact with hydrocarbon liquid thereby heating said hydrocarbon liquid, thereafter further heating both said hydrocarbon liquid and said hydrocarbon-rich phase by direct countercurrent contact with liquid heat exchange medium heated by said extract, further heating resulting hydrocarbon-rich liquid to said elevated temperature above about 500° F. and passing said hydrocarbon-rich liquid into contact with said brine for the extraction of water therefrom.

8. A process according to claim 7 in which said hydrocarbon liquid is Udex extract and said heat transfer agent is mercury.

9. A process according to claim 7 in which hydrocarbon liquid at a temperature above 500° F. is passed in direct countercurrent contact with relatively cool feed brine thereby heating said brine to an elevated temperature and cooling said hydrocarbon liquid.

10. A process as defined in claim 9 in which residual brine separated from said extract at a temperature above 500° F. is cooled by direct countercurrent contact with cool hydrocarbon liquid resulting from heating of said feed brine.

References Cited

UNITED STATES PATENTS 2,298,791   10/1942   Harrington _____ 208—311

OTHER REFERENCES

Report No. 22: Research on Liquid-Liquid Extraction for Saline Water Conversion, U.S. Dept. of Interior, December 1958, pp. 2–6 relied on.

MICHAEL E. ROGERS, *Primary Examiner.*